(12) United States Patent
Courtright et al.

(10) Patent No.: US 9,221,500 B1
(45) Date of Patent: Dec. 29, 2015

(54) CRUSH TUBE AND SUPPORT STRUCTURE FOR A PICKUP TRUCK BED

(71) Applicant: FORD GLOBAL TECHNOLOGIES, LLC, Dearborn, MI (US)

(72) Inventors: Mark Joseph Courtright, Allen Park, MI (US); Dragan B. Stojkovic, Taylor, MI (US); Vincent Chimento, Plymouth, MI (US); Philip Van Wyk, Burlen, WA (US); Lawrence J. Dupuis, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 20 days.

(21) Appl. No.: 14/316,157

(22) Filed: Jun. 26, 2014

(51) Int. Cl.
*B62D 25/20* (2006.01)
*B62D 33/077* (2006.01)
*B62D 33/02* (2006.01)
*B62D 29/00* (2006.01)

(52) U.S. Cl.
CPC ............ *B62D 33/077* (2013.01); *B62D 29/008* (2013.01); *B62D 33/02* (2013.01)

(58) Field of Classification Search
CPC ..... B62D 33/077; B62D 29/008; B62D 33/02
See application file for complete search history.

(56) References Cited

U.S. PATENT DOCUMENTS

| 2,622,895 | A | 12/1952 | Larsen |
| 3,097,877 | A | 7/1963 | Erlandsen |
| 3,159,982 | A | 12/1964 | Schachner |
| 3,187,853 | A | 6/1965 | Glaser et al. |
| 4,186,537 | A | 2/1980 | Mountz |
| 4,283,066 | A | 8/1981 | Brown et al. |
| 6,729,639 | B2 | 5/2004 | Tomita |
| 6,805,379 | B2 | 10/2004 | Nommensen |
| 7,152,911 | B1 | 12/2006 | McNulty et al. |
| 7,819,463 | B2 | 10/2010 | Werner |
| 8,262,155 | B2 | 9/2012 | Leanza |
| 8,414,066 | B2 | 4/2013 | Hustyi et al. |
| 2005/0057060 | A1 | 3/2005 | Edwards et al. |
| 2008/0134589 | A1 | 6/2008 | Abrams et al. |
| 2009/0206632 | A1 | 8/2009 | Biersack |
| 2010/0013267 | A1 | 1/2010 | Rogers et al. |
| 2011/0298245 | A1* | 12/2011 | Jarocki .................. B62D 21/03 296/193.07 |
| 2012/0049501 | A1 | 3/2012 | Fujii et al. |
| 2012/0286543 | A1 | 11/2012 | Lee, III |

(Continued)

FOREIGN PATENT DOCUMENTS

CH 219557 A 8/1942
DE 19522219 1/1997

(Continued)

*Primary Examiner* — Lori L Lyjak
(74) *Attorney, Agent, or Firm* — Jason Rogers; Brooks Kushman P.C.

(57) ABSTRACT

A vehicle includes a pair of longitudinal frame rails and a bed above the frame rails. A plurality of roll-formed aluminum cross-members contact the bed and are disposed between the bed and the frame rails for additional support of the bed. Extruded aluminum spacers are disposed between and in contact with the one of the cross members and one of the frame rails. A crush tube is spin-welded to the spacer and contacts the underside of the bed for additional support to inhibit downward relative movement of the bed. The crush tube is formed with a longitudinal hole extending therethough to receive a fastener that extends from above the truck bed, through the crush tube hole, through the cross-member and spacer, and into the frame rail.

13 Claims, 3 Drawing Sheets

(56) References Cited

U.S. PATENT DOCUMENTS

| | | |
|---|---|---|
| 2013/0043701 A1 | 2/2013 | Hagenbuch |
| 2013/0249203 A1 | 9/2013 | Jung |
| 2013/0313860 A1 | 11/2013 | Yamaji et al. |
| 2014/0001731 A1 | 1/2014 | Booher et al. |
| 2014/0062143 A1 | 3/2014 | Lane et al. |
| 2014/0145469 A1 | 5/2014 | Mildner et al. |
| 2014/0232146 A1 | 8/2014 | Choi et al. |
| 2014/0345091 A1 | 11/2014 | Pierce et al. |

FOREIGN PATENT DOCUMENTS

| | | |
|---|---|---|
| EP | 1262395 | 12/2002 |
| FR | 2833919 | 6/2003 |
| GB | 1589125 | 5/1981 |
| JP | 2001247051 A | 9/2011 |

\* cited by examiner

CRUSH TUBE AND SUPPORT STRUCTURE FOR A PICKUP TRUCK BED

TECHNICAL FIELD

The present disclosure relates to a crush tube for a pickup truck. More particularly, the present disclosure relates to an extruded crush tube between a truck bed and frame rails of a pickup truck for supporting the truck bed.

BACKGROUND

Pickup trucks are motor vehicles with a rear open top cargo area that is often referred to as a bed. Pickup trucks are popular largely because the bed allows the vehicle to be utilized in many different ways, including carrying a variety of types of cargo and towing various types of trailers. Traditionally, the majority of body structures on pickup trucks have been formed from steel alloys. Through years of experience, pickup truck designers have learned how to design steel truck body parts that withstand the variety of demanding pickup truck applications. The current regulatory and economic environment have increased the importance of making pickup trucks more fuel efficient while maintaining or improving functionality and durability. One way to reduce the fuel consumption of a vehicle, especially when unloaded, is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. Additionally, fabrication techniques and methods of joining parts that work well for steel parts may not work well for the same aluminum part. Due to these and other differences, simple material substitution does not necessarily produce an acceptable design.

Aluminum alloys are generally identified by a four-digit number, the first digit of which typically identifies the major alloying element. When describing a series of aluminum alloys based on the major alloying element, the first number may be followed by three x's (upper or lower case) or three zeros. For example, the major alloying element in 6xxx (or 6000) series aluminum alloy is magnesium and silicon, while the major alloying element of 5xxx series is magnesium and for 7xxx series is zinc. Additional numbers represented by the letter 'x' (or zeros) in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

SUMMARY

According to one embodiment, a method of manufacturing a truck bed assembly is provided. The method comprises extruding an aluminum tube, and extruding an aluminum reinforcement member having a channel with an interior surface. The tube is spin-welded to the interior surface of the reinforcement member. A cross-member is roll-formed and a hole is formed in the cross-member. The method also includes inserting the tube through the hole in the cross-member while nesting the cross-member against the interior surface of the channel. The reinforcement member maintains the cross-member and a frame rail of the vehicle in a spaced relationship.

The method may also include stamping an aluminum truck bed, connecting the tube or cross-member to the bed, and inserting a fastener through the bed, the tube, the cross-member, and the reinforcement member to be attached to the frame rail of a vehicle.

In another embodiment, a vehicle comprises a pair of longitudinal frame rails and a bed disposed above the frame rails. A transversely extending cross-member is disposed between the bed and the frame rails, and contacts the bed. A spacer is disposed between and contacts the cross-member and one of the frame rails. A tube is spin-welded to the spacer and contacts the bed.

The cross-member may include a base and a pair of opposing sidewalls extending from the base toward the bed. The spacer may include a base contacting the base of the cross-member and one of the frame rails to separate the two. The tube may include a hollow interior sized to receive an attachment member or fastener that indirectly connects the bed to the frame rails with a space therebetween.

In another embodiment, a reinforcement assembly for a cargo bed of a truck is provided. A cross-member has a surface defining an aperture therethrough and an elongated channel. An extruded reinforcement member is secured to the cross-member outside of the channel. The reinforcement member is disposed between the cross-member and a frame rail of the truck. An extruded tubular member is spin-welded to the reinforcement member and is disposed through the aperture and into the channel.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
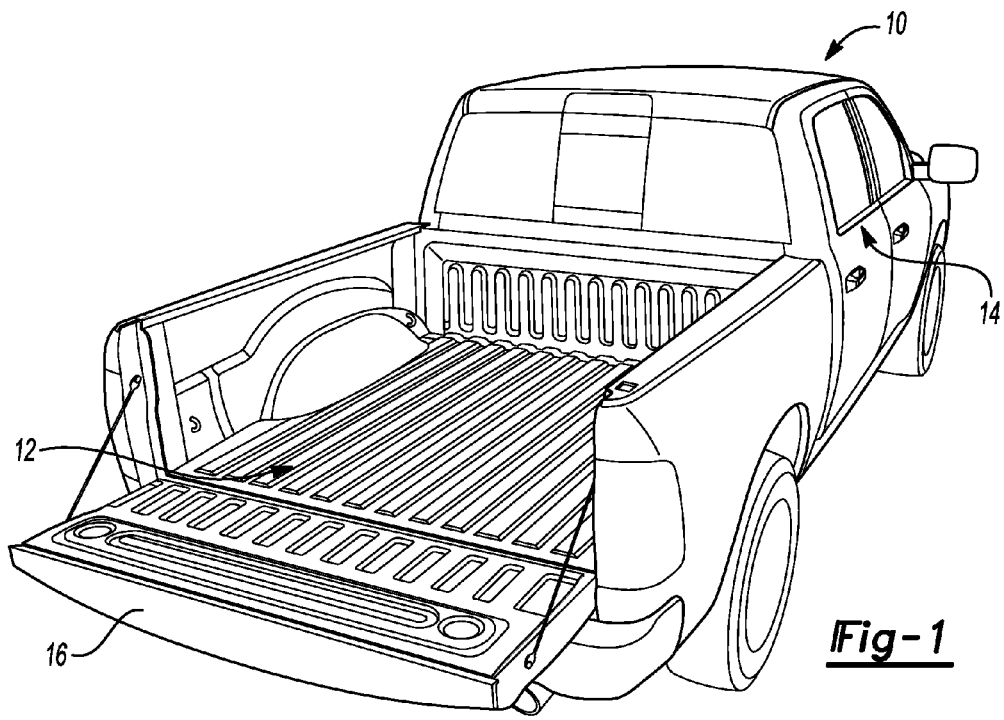
FIG. 1 is a perspective view of a pickup truck having a truck bed according to one embodiment of the present disclosure.

FIG. 1 illustrates a pickup truck 10 having many structural elements made of aluminum. The pickup truck 10 includes a cargo bed or truck bed 12 that is rearward of a passenger compartment 14 of the truck. The truck bed 12 is shown with an open and exposed top, although other embodiments exist in which the truck bed is covered. A tailgate 16 is hinged at its bottom to provide access to the upper surface of the truck bed 12. When opened, the tailgate 16 and the upper surface of the truck bed 12 can be coplanar to provide a flat load surface.

Many of the components of the pickup truck 10 can be made of aluminum. The truck bed 12 is no exception, and may be made of 6000-series aluminum. If such a material choice is made for the truck bed 12, additional reinforcement structures may be provided to aid in the strength and rigidity of the truck bed 12. These reinforcement structures, as will be described below, can also be made of 6000-series aluminum. Particular configurations of these reinforcement structures provide the aluminum truck 10 with strength comparable to typical trucks that are made mostly of steel.

Figure 2:
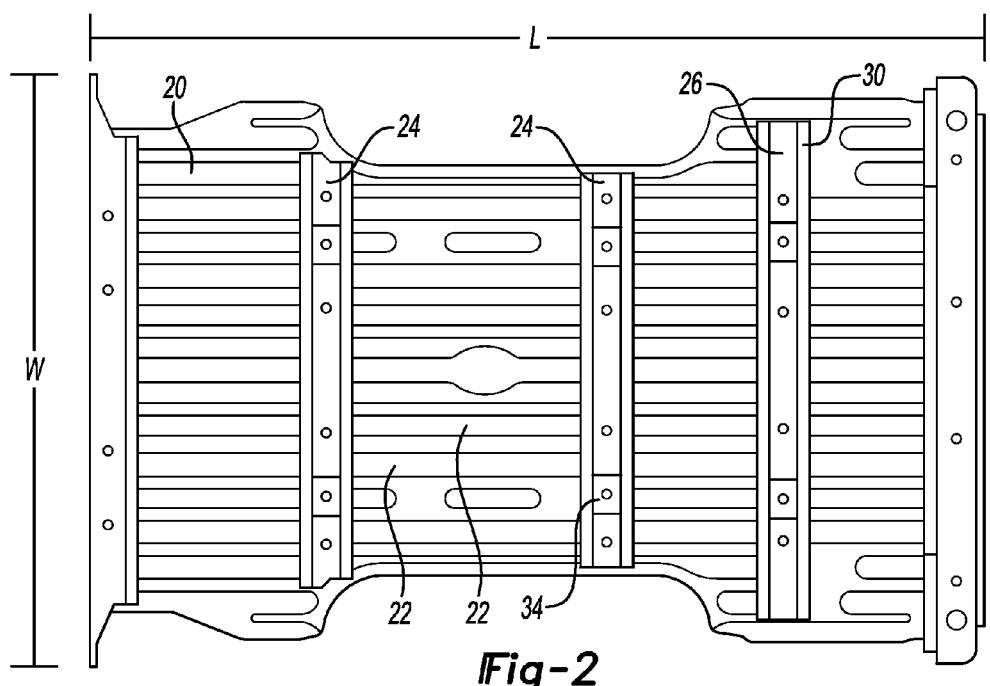
FIG. 2 is a bottom plan view of the truck bed with a plurality of reinforcement assemblies attached thereto according to one embodiment.

FIG. 2 shows the underside 20 or bottom surface of the truck bed 12. The truck bed includes a length L, extending along the length of the truck, and a width W. As can also be seen in FIG. 1, the truck bed can include a series of longitudinal grooves 22 to add structural rigidity. Even with these grooves 22, the bed can still be referred to as substantially flat, as the majority of the upper surface of the bed is indeed flat.

Figure 3:
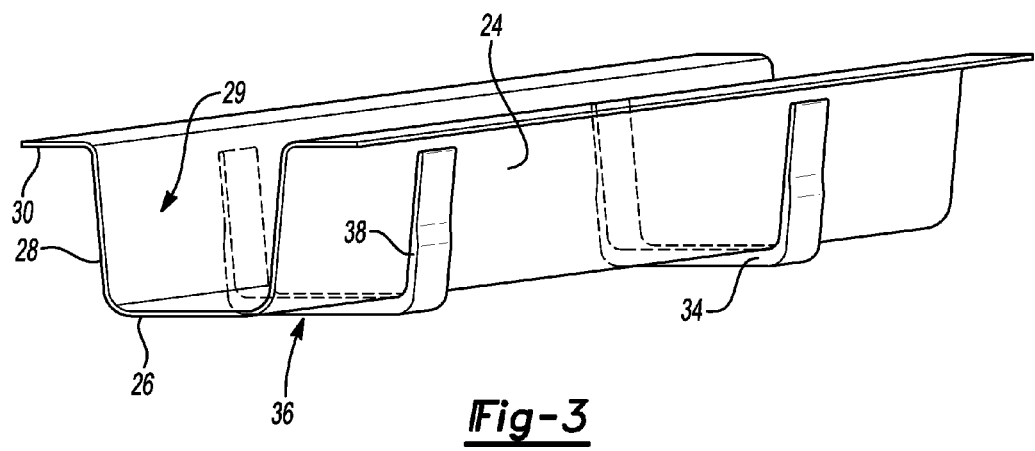
FIG. 3 is a perspective view of a cross-member and a pair of reinforcement members of the reinforcement assembly for securing to the bottom surface of the truck bed according to one embodiment.
Figure 4:
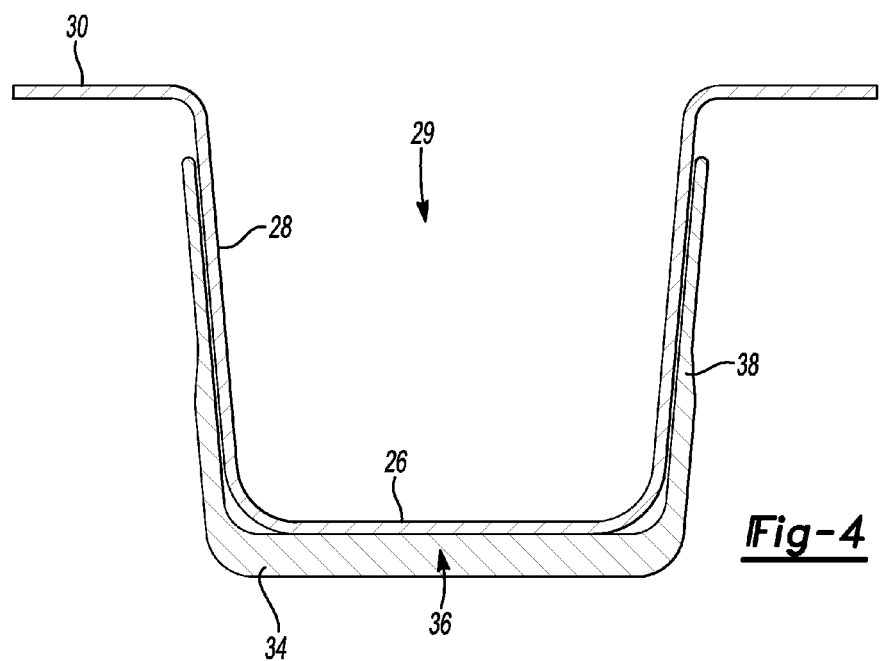
FIG. 4 is a cross-section taken along line 3-3 of the reinforcement assembly of FIG. 3.

Beneath the underside 20 of the truck bed is a plurality of reinforcement assemblies, a portion of which are shown in isolation in FIG. 3. Each of the reinforcement assemblies includes a cross-member 24 extending across the grooves 22 and along the width of the truck bed 12. Each cross-member 24 includes a generally horizontal (parallel to the truck bed) base 26. A pair of opposing sidewalls 28 extend from the base 26 at relative obtuse angles (e.g., between 91-110 degrees) from the base 26. These opposing sidewalls 28 also extend along the length of the cross-member 24, forming a channel 29 within the concave or interior surface of the cross-member 24. A pair of flanges 30 is spaced from and parallel to the base 26, with each flange extending from a respective sidewall. The flanges provide engagement surfaces to engage the reinforcement assembly to the underside 20 of the truck bed.

The cross-members 24 can be made of 6000-series aluminum that is roll-formed. Roll-forming is an efficient method of manufacturing a stamped component in which the shape of the component is constant and free of any undulations or stark changes in geometry. A roll-formed cross-member 24 provides a longitudinal, one-piece supporting beam that adequately provides support to the truck bed.

Referring to FIGS. 2-5, a plurality of spacers or reinforcement members 34 are provided on the outside surface of each of the cross-members 24. The reinforcement members 34 each include a base 36 that engages a respective cross-member 24. Sidewalls 38 of the reinforcement member 34 also extend from the base 36 at angles similar to that of the sidewalls 28 extending from the base 26 of the cross-member. A channel is defined by the base 36 and the sidewalls 38. The base 36 and the sidewalls 38 are configured to engage with and contact the base 26 and sidewalls 28 of the cross-member 24.

To supplement the strength of a single-piece roll-formed cross-member 24, the reinforcement member 34 can be made of 6000-series aluminum that is extruded. In an extrusion process, aluminum in a malleable state can be "pushed" through a formed shape, such as the shape of the reinforcement member, and cut or broken to length. When placed below the cross-member 24 and opposite from the truck bed, the reinforcement member 34 acts as a spacer to create a clearance zone for components beneath the truck bed. This eliminates the need to create localized dents in the truck bed or the cross-members 24, enabling roll-forming due to a constant shape (as previously described).

The base 36 of the reinforcement member 34 can be extruded and formed such that it is sized to provide adequate clearance for the given vehicle package clearance conditions beneath the truck bed 12. The base 36 may be thicker than the sidewalls 38 to not only aid in support beneath the cross-member 24 relative to the sides of the cross-member 24, but also to provide for the clearance beneath the cross-member 24. The base 36 and the sidewalls 38 add strength to the cross-member 24, inhibiting crushing of the cross-member 24 under heavy loads while maintaining clearance between the truck bed and components beneath.

Figure 5:
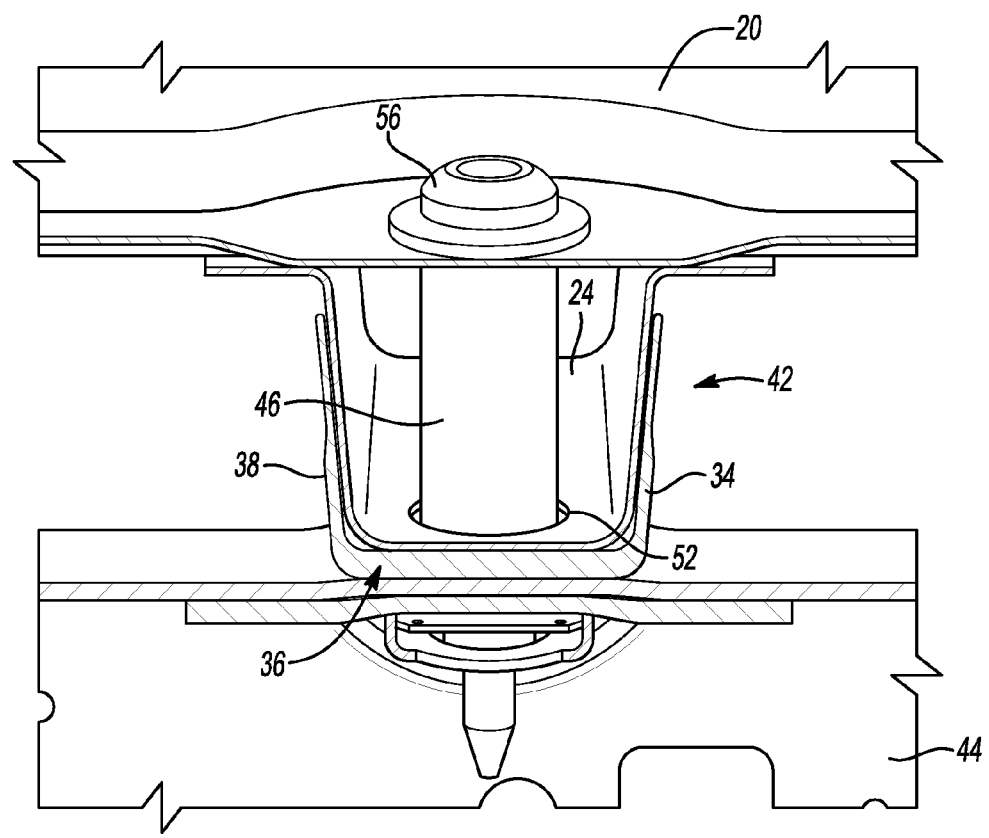
FIG. 5 is a side perspective view of the reinforcement assembly secured under the truck bed and above frame rails of the pickup truck according to one embodiment.
Figure 6:
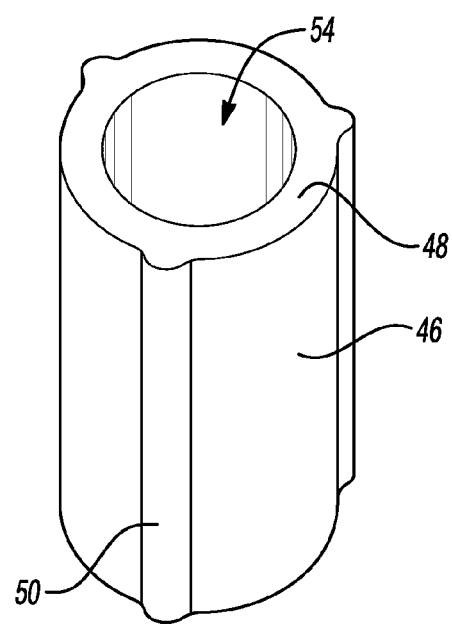
FIG. 6 is a perspective view of a tubular member for spin-welding onto a cross-member of the reinforcement assembly, according to one embodiment.

A typical pickup truck includes a pair of frame rails that are disposed below the truck bed 12 and run along the length L of the truck bed. Referring to FIG. 5, the cross-member 24 and the support member 34 are shown as part of a reinforcement assembly 42 between the truck bed 12 and one or more frame rails 44 of the truck. Rather than a direct connection between the truck bed 12 and the frame rails 44, the reinforcement assembly 42 may provide a space between the underside 20 of the truck bed 12 and the frame rails 44. In particular, the flanges 30 of the cross-member 24 contact the underside of the truck bed 12, while the base 36 of the support member 34 contacts one of the frame rails 44.

To secure the reinforcement assembly 42 between the truck bed 12 and the frame rails 44, a crush tube or extruded tube 46 is provided on each support member 34. Each tube 46 may be spin-welded to an upper surface of the base 36 of the reinforcement member 34. For example, in one embodiment, an end face 48 of the tube 46 can be spin-welded on the base 36 with the length of the tube 46 extending between the sidewalls 38. A plurality of annularly-spaced surface features 50 are provided about the outer surface of the tube 46 to facilitate the flow of aluminum during the spin-welding. The surface features 50 are shown as rounded ribs that are regularly- and annularly-spaced and extend along the length of the tube 46. The surface features 50 may be any other shape capable of providing additional material about the outer surface of the tube to facilitate spin-welding. In other embodiments, the surface features 50 include one or more longitudinal groove formed in the outer surface of the tube 46. In yet other embodiments, a series of alternating grooves and ribs are formed on the outer surface.

The extruded aluminum tube 46 spin-welded to the extruded aluminum reinforcement member 34 provides additional support under the truck bed 12 and maintains a spaced relationship between the truck bed 12 and the reinforcement member 34 and frame rails 44. The tube 46 acts to further inhibit crushing of the cross-member 24 and its supporting components under heavy loads.

An exemplary method of manufacturing and assembling the reinforcement assembly 42 will now be described. A plurality of the 6000-series aluminum cross-members 24 are formed via roll-forming, including the base 26, sidewalls 28 and flanges 30 described above. At least two clearance holes 52 are punched, cut or otherwise formed in the cross-member 24 at spaced-apart locations to be later aligned with the frame rails 44 transverse to the cross-member. Reinforcement members 34 having the base 36 and sidewalls 38 described above are formed via extruding 6000-series aluminum such that the reinforcement members 34 include channels. Tubes 46 with surface features 50 are also formed via extruded 6000-series aluminum. The tube 46 can be extruded such that a hole 54 exists through the central axis of the tube 46. Each tube 46 is spin-welded to the interior surface within the channel of each reinforcement member 34. A hole (not shown) in the reinforcement member 34 may also be formed and aligned with the hole 54 of the tube 46.

Once welded, one of the tubes 46 is inserted through a clearance hole 52 of one of the cross-members 24. Because of the similar shapes of the bases and sidewalls, the reinforcement member 34 can be pressed such that its interior surface nests with the exterior surface of the cross-member 24. This aligns the reinforcement member 34 and tube 46 of one cross-member 24 with one of the frame rails 44. The process can be repeated to nest two reinforcement members 34 with each of the cross-members 24 at locations to be secured to the frame rails 44 (explained below). Each reinforcement member 34 maintains a spaced relationship between the cross-member 24 and the frame rail 44, while indirectly connecting the two. A fastener 56 (e.g., bolt, screw, etc.) can then be driven or inserted into the truck bed 12, through the hole 54 of the tube 46, through the reinforcement member 34 and into the frame rail 44. This secures the reinforcement assembly 42 between the truck bed 12 and the frame rail 44 in a cargo bed assembly.

As mentioned above and best seen in FIG. 2, the reinforcement assembly 42 includes the one roll-formed cross-member 24 with a pair of spaced apart extruded support members 34. Each of the support members 34 is aligned with one respective frame rail beneath the truck bed extending along the length L of the truck bed. In other words, a plurality of support members 34 attached to different cross-members 24 are aligned along a single frame rail. In the embodiment illustrated in FIG. 2, three cross-members 24 are provided, each having a pair of support members 34. Half of the support members 34 are linearly aligned for attaching to one frame rail, while the other half of the support members 34 are linearly aligned for attaching to another frame rail. Other embodiments are contemplated in which more or less than the illustrated number of cross-members and/or support members are provided.

While embodiments described above are directed to a pickup truck, it should be understood that the structural features of the present disclosure can be utilized with other vehicles, for example sports utility vehicles (SUVs), vans, etc.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a pair of longitudinal frame rails;
a bed disposed above the frame rails;
a transversely extending cross-member contacting the bed and disposed between the bed and the frame rails;
a spacer disposed between and in contact with the cross-member and one of the frame rails; and
a tube spin-welded to the spacer and contacting the bed.

2. The vehicle of claim 1, wherein the spacer indirectly connects the cross-member to one of the frame rails.

3. The vehicle of claim 1, wherein the cross-member includes a base and a pair of opposing sidewalls extending from the base toward the bed.

4. The vehicle of claim 3, wherein the spacer includes a base contacting the base of the cross-member and one of the frame rails.

5. The vehicle of claim 1, wherein the tube includes a plurality of annularly-spaced surface features about an outer surface of the tube.

6. The vehicle of claim 5, wherein the surface features are ribs extending along a length of the tube.

7. The vehicle of claim 1, wherein the tube includes a hollow interior sized to receive a fastener that indirectly connects the bed to the frame rails with a space therebetween.

8. The vehicle of claim 1, wherein both the spacer and the tube are extruded aluminum.

9. A reinforcement assembly for a cargo bed of a truck comprising:
a cross-member having a surface defining an aperture therethrough and an elongated channel;
an extruded reinforcement member secured to the cross-member outside of the channel, the reinforcement member disposed between the cross-member and a frame rail of the truck; and
an extruded tubular member spin-welded to the reinforcement member and disposed through the aperture and into the channel.

10. The reinforcement assembly of claim 9, wherein the extruded tubular member engages the cargo bed of the truck at an end of the extruded tubular member opposite from the frame rails.

11. The reinforcement assembly of claim 9, wherein the extruded tubular member includes surface features about an outer surface of the extruded tubular member.

12. The reinforcement assembly of claim 11, wherein the surface features are ribs that extend along a length of the extruded tubular member.

13. The reinforcement assembly of claim 9, further comprising fastener extending though the extruded tubular member, the aperture in the cross-member, the extruded reinforcement member, and the frame rails.

* * * * *